United States Patent [19]

Moore

[11] Patent Number: 4,737,331
[45] Date of Patent: Apr. 12, 1988

[54] METHOD AND APPARATUS FOR FEEDING AND SEVERING CONNECTED ARTICLES

[75] Inventor: Eugene L. Moore, Lakewood, Colo.
[73] Assignee: Manville Corporation, Denver, Colo.
[21] Appl. No.: 851,001
[22] Filed: Apr. 11, 1986
[51] Int. Cl.[4] .......................... B29C 37/00; B26D 5/26
[52] U.S. Cl. ..................... 264/160; 264/137; 264/236; 264/347; 83/277; 226/162
[58] Field of Search ............... 83/255, 277, 408, 566, 83/568, 925 R; 226/162–166; 264/160, 137, 236, 347

[56]  References Cited
U.S. PATENT DOCUMENTS

| | | | |
|---|---|---|---|
| 3,222,971 | 12/1965 | Gerletz | 83/277 X |
| 3,425,611 | 2/1969 | Zelnick | 226/162 |
| 3,574,291 | 4/1971 | Rosendahl | 83/408 X |
| 3,759,122 | 9/1973 | Lane | 83/925 R |
| 4,253,364 | 3/1981 | Kiefer et al. | 83/277 X |
| 4,376,400 | 3/1983 | Gazzarrini | 83/277 X |
| 4,504,004 | 3/1985 | Griesdorn | 226/162 X |
| 4,513,899 | 4/1985 | Ledgerwood | 226/162 X |

Primary Examiner—Donald R. Schran
Attorney, Agent, or Firm—John D. Lister; Cornelius P. Quinn; Timothy R. Schulte

[57] ABSTRACT

Clamps mounted on a reciprocal frame grip a web of connected molded fibrous articles and move toward a cutter a distance equal to one article length, thereby presenting to the cutter the connecting portion between adjacent articles and also pulling the next portion of uncured fibrous material into the mold press for shaping and curing. After the cutting operation the clamps open and move toward the mold into position to again grip and feed the web toward the cutter. Connected rows of webs can also be handled by slitting the rows as they move toward the cutter. The articles, which can be quite deep compared to the thickness of the connecting portions between articles, are supported during travel and while stationary by support plates separate from the reciprocal frame. The various components which contact or cause movement or cycling of the apparatus can be adjusted to permit handling of articles and webs of different dimensions.

11 Claims, 5 Drawing Sheets

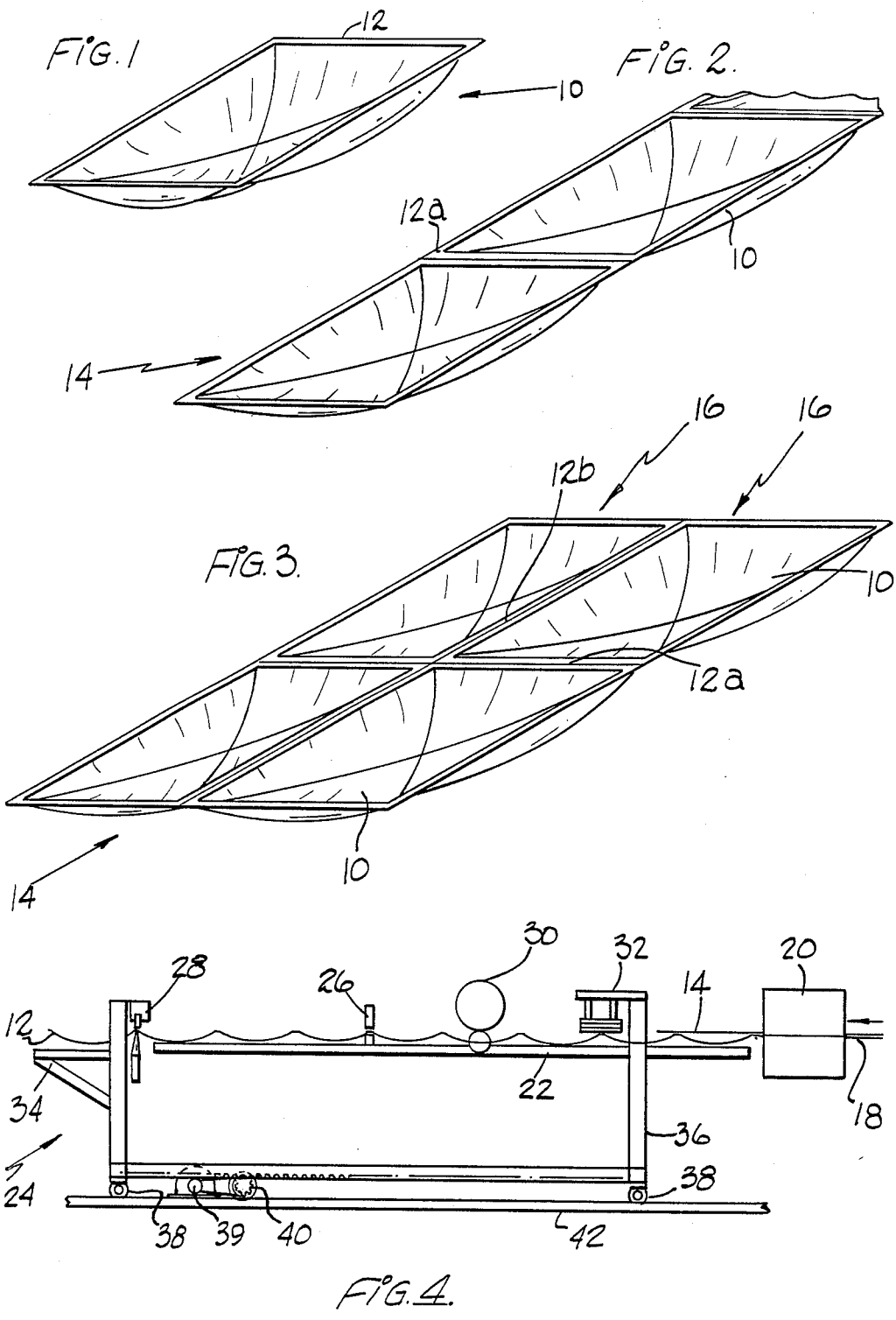

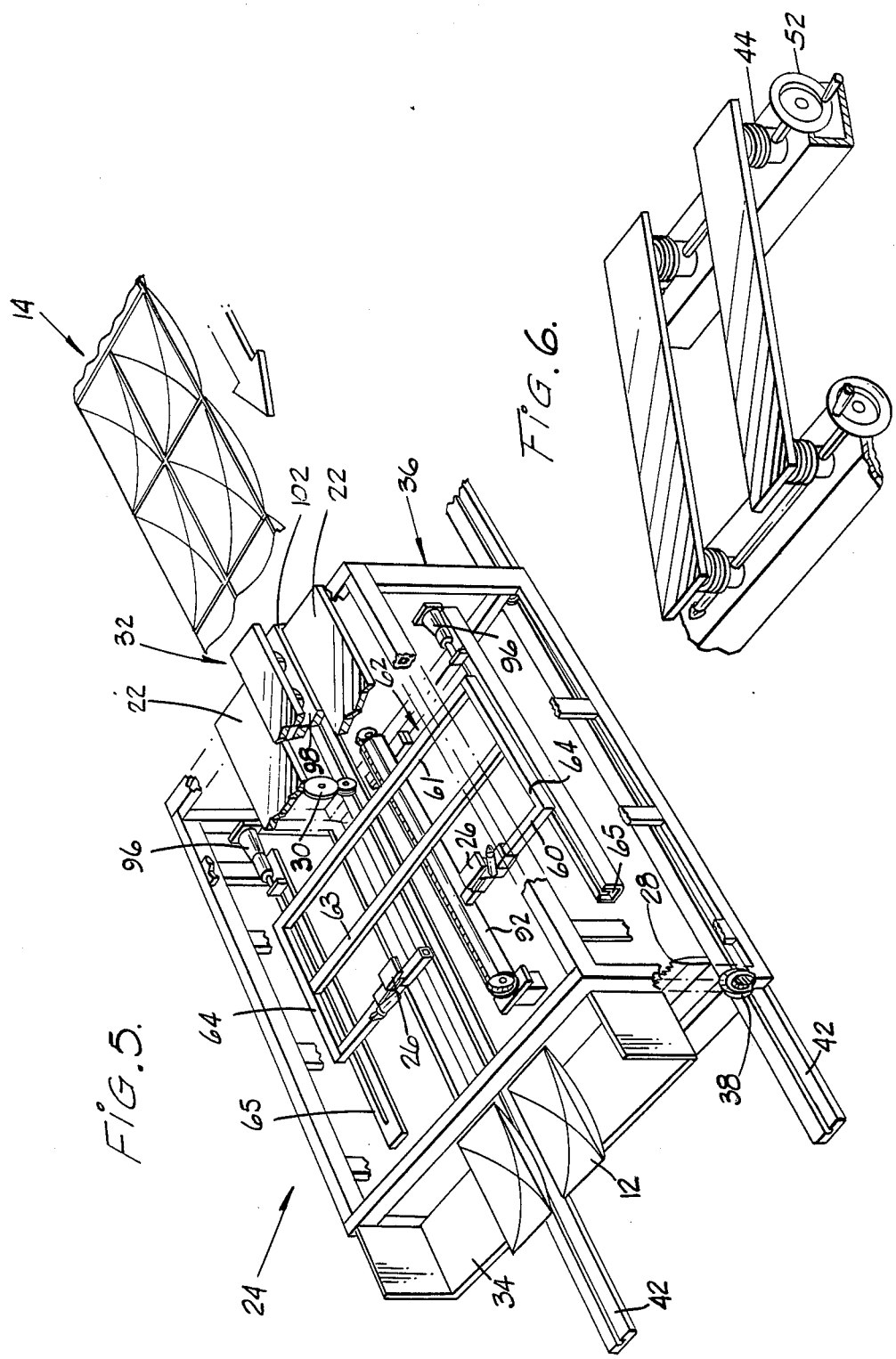

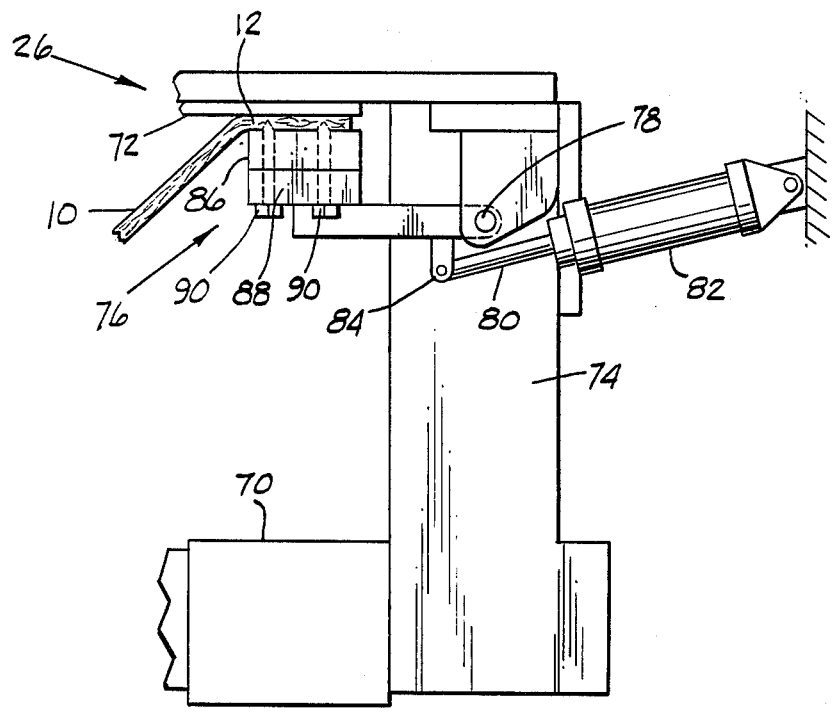
FIG. 8.
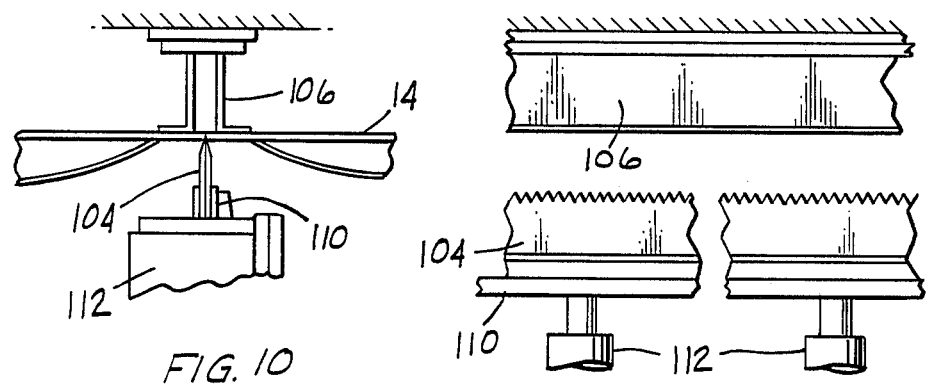
FIG. 10.
FIG. 11.

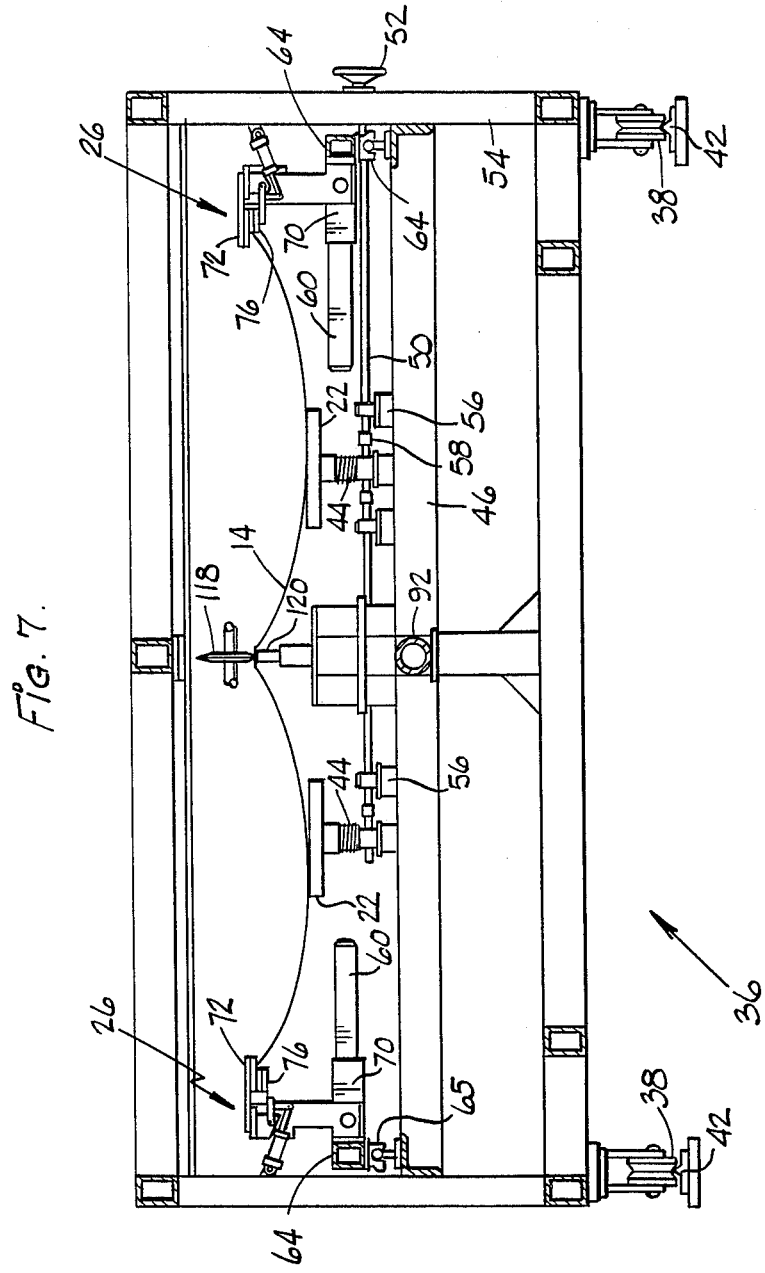

METHOD AND APPARATUS FOR FEEDING AND SEVERING CONNECTED ARTICLES

FIELD OF THE INVENTION

This invention relates to a method and apparatus for feeding connected articles to a cutting station and severing the leading article from the rest. In particular, it relates to the intermittent feeding of a web of connected articles and the severing of the leading article therefrom.

BACKGROUND OF THE INVENTION

In the manufacture of molded shaped products the mold typically is charged with raw material and after the molding cycle the formed product is removed. Normally the formed product is not connected to other similar products and, except for trimming, does not have to be fed through a cutting station.

In the manufacture of molded fibrous products, however, this is often not the case. For example, in the manufacture of molded fiberglass articles, such as automotive hoodliners and topliners, the raw material fed into the mold press is in the form of a sheet or blanket of fiberglass comprised of glass fibers bonded together by uncured binder. The blanket remains attached to the portion in the mold press both during and after the molding operation so that when the finished product is pulled away from the open press the next uncured portion is thereby introduced into the press.

Because the finished products are often quite large and bulky, and because the depth of their concave shape can be significant, it is difficult to automatically handle and cut such products. Compounding the problem is the desire to mold more than one product at a time in order to increase the efficiency of the molding operation. Conventional feed rolls, for example, would not be capable of handling the product regardless of the type of molding operation utilized. On the other hand, the alternative of manually handling and cutting the finished products is not acceptable from the point of view of cost and efficient manpower usage. Ideally, the availability of a new feeding and cutting apparatus capable of handling this type of product would solve the problems mentioned above.

BRIEF SUMMARY OF THE INVENTION

This invention provides a clamp or gripping means capable of reciprocal or oscillating movement which acts to grip the web of connected articles and move the web toward the cutter so as to present a cured article to the cutter while at the same time feeding a length of uncured blanket into the mold for the next molding operation. The reciprocal movement of the gripping means is intermittent and is timed to be at rest during the duration of the curing cycle. The cutter severs the leading article from the web while the gripping means is stationary.

A number of other features are also provided, such as a means for supporting the bottoms of the contoured products while they are being fed from the mold to the cutter and a slitting arrangement for slitting connected longitudinal rows of articles removed from a multi-unit mold press. In addition, the apparatus is capable of being adjusted to handle products of varying sizes.

These and other features and aspects of the invention, as well as its various benefits, will be made clear in the more detailed description of the invention which follows.

BRIEF DESCRIPTION OF THE DRAWINGS

FIG. 1 is a pictorial representation of a typical molded product which the apparatus of the invention is designed to handle;

FIG. 2 is a pictorial representation of a web consisting of a single row of connected molded products;

FIG. 3 is a pictorial representation of a web formed of two connected rows of connected molded products;

FIG. 4 is a schematic side elevation of the apparatus of the present invention illustrating the various stations through which the web of connected articles passes;

FIG. 5 is a pictorial representation of the apparatus of the present invention with portions of the support frame removed for purpose of clarity;

FIG. 6 is a pictorial representation of the support tray arrangement which supports the web of connected articles as it moves through the feeding and cutting apparatus;

FIG. 7 is a sectional view showing the support tray and clamping arrangements;

FIG. 8 is an enlarged elevation of one of the clamps shown in FIG. 7, illustrating further details of the clamp;

FIG. 10 is an end elevation of the cutter blade and anvil; and

FIG. 11 is a side elevation of the cutter blade and anvil.

DESCRIPTION OF THE INVENTION

Figure 9:
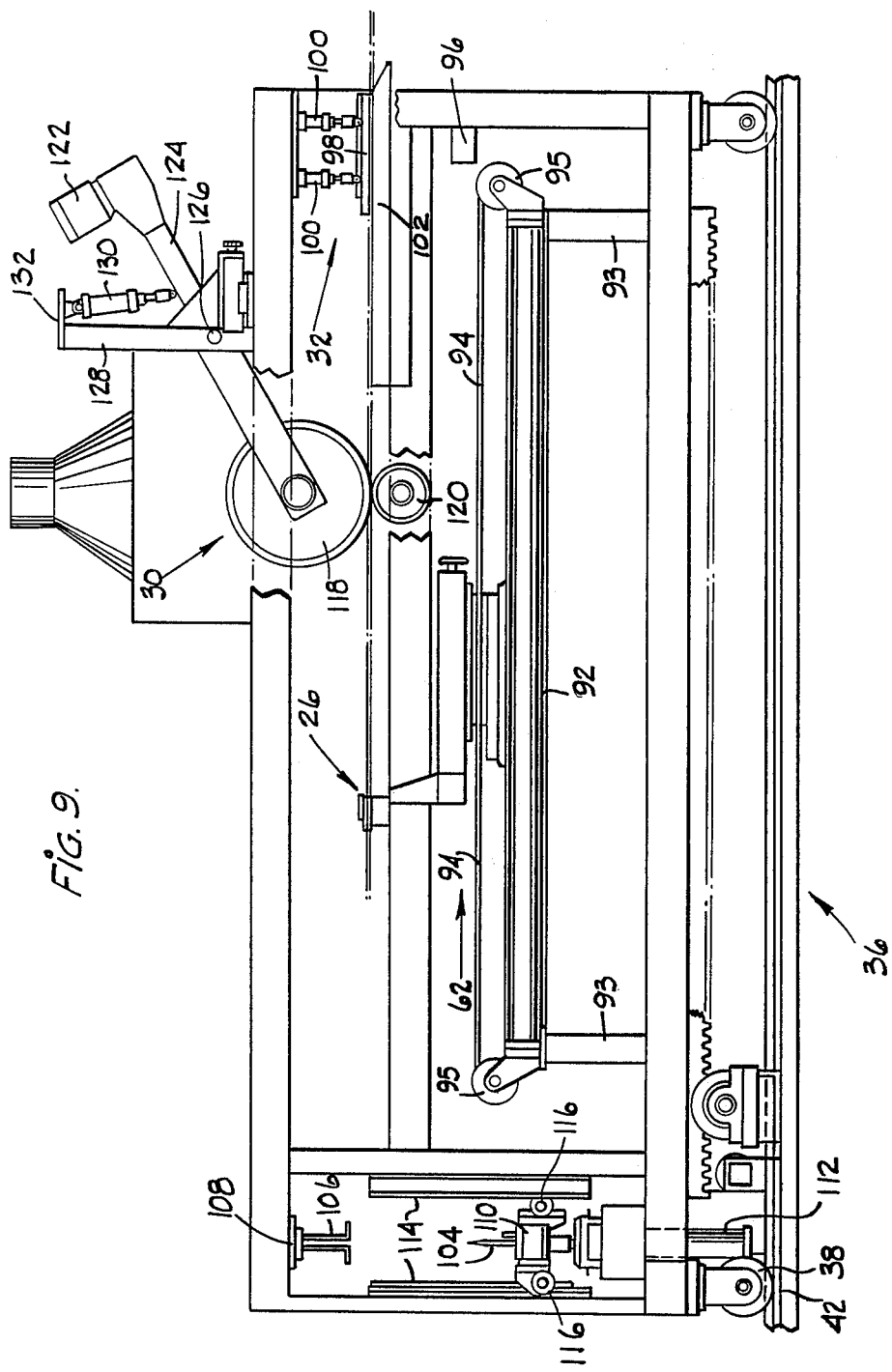
FIG. 9 is a side elevation of the apparatus of the invention, with parts of the structure removed to show the stop camp, the slitter, the reciprocal frame and the chopper in more detail.

Referring to FIG. 1, reference numeral 10 indicates a molded product typical of the type the present invention has been designed to handle. A relatively small flange 12 extends around the perimeter of the shaped or contoured article 10. As previously stated, the dimensions of the article can be quite large, ranging in practice from four to twelve feet in length and up to twelve feet in width. In addition, the depth of the article as measured downwardly from the flange can be substantial, typically extending a distance up to twelve inches. Of course the dimensions of the apparatus can be designed to handle products having dimensions outside this range if desired.

As shown in FIG. 2, the articles 10 are presented to the feeding and cutting apparatus in the form of a web 14 of articles connected to each other by flange portions 12a extending transversely of the length of the web 14. The connecting portions 12a are twice the width of the flanges 12 of the article shown in FIG. 1 in order to provide flanges of the proper width after the cutting operation separates the articles by severing them along the center of the flange 12a. The invention can be used to handle articles presented in a single row as described thus far or in multiple rows. As shown in FIG. 3, a double row of articles 10 is comprised of longitudinal rows 16 connected to each other by longitudinal flanges 12b. In order to separate the rows, it is necessary to sever them along flange 12b.

Referring to FIG. 4, the uncured blanket 18 is shown entering the mold press 20 in the direction of product flow, as indicated by the arrow. At the same time, the molded web 14 moves from the press onto a support surface 22 which is part of the feeding and cutting apparatus 24. The movement of the blanket and web is caused by the web being gripped by clamp 26 which moves toward the cutter 28 a distance of one article length while the mold press is open. If the web consists of a double row of connected articles as shown in FIG. 3, slitter 30 slits the rows apart as the web travels past the slitter. The leading article 12 is severed from the web by the cutter 28 when the web is at rest and held in place by the clamp 26. A second clamp 32 located upstream from the slitter is also used to hold the web in place during the cutting operation. The severed article is supported by discharge tray 34.

While the web is at rest the mold press is closed and forming another molded article from the uncured blanket which has been pulled into the press by the travel of the clamp 26 toward the cutter 28. The main frame 36 supporting the various components of the feeding and cutting apparatus 24 is mounted on wheels 38 enabling the support frame to be relocated by means of drive motor 39 and rack and pinion 40 to a different point on the track 42 for purpose of adjustment as will be explained more fully hereinafter.

The feeding and cutting apparatus 24 is shown in greater detail in FIG. 5, in which some of the structural support members of the main frame 36 have been removed in order to better show the various features of the apparatus. Supported on the frame 36 are the support surfaces 22 which in practice take the form of spaced trays on which the bottoms of the finished articles are supported when at rest and on which they slide during movement of the web of articles toward the cutter. The support trays 22 preferably extend from a point beyond the upstream end of the frame 36 to a point just upstream from the cutter 28. By using spaced trays as the support surface, the space between them can accommodate the slitter 30 when a double row of molded products is formed in the mold press.

As shown more clearly in FIGS. 6 and 7, the trays 22 are supported by screw jacks 44 which in turn are supported by cross beams 46 and 48 of the main frame 36. The screw jacks 44 are vertically adjustable by threaded shaft 50 which extends from handwheel 52 through vertical frame member 54 and through guides 56 and couplings 58 to the screw jacks 44. Although other raising and lowering means could be used, hand actuated screw jacks are preferred because they assure positive movement of the trays 22 as a unit, they take up little space and they allow quick adjustments to be made when setting up the apparatus for products of different depths.

Referring back to FIG. 5, the clamps 26 can be seen to be supported on the downstream cross beam 60 of reciprocal frame 62. Making up the rest of the reciprocal frame 62 are upstream cross beam 61 and center support cross beam 63, all of the cross beams being connected at their ends to longitudinal beams 64 which are slidably mounted on longitudinal beams 65 of the main frame 36. The cross beam 60 is shown as being of slightly smaller size than clamp sleeves 70, thus permitting the clamps to be adjustably secured by any convenient means such as bolts or clamps along the cross beam to accommodate webs of varying widths.

As shown in more detail in FIG. 8, each clamp 26 comprises fixed upper jaw 72 supported by vertical support members 74 extending upwardly from sleeves 70. The lower movable jaw 76 is pivotally connected to vertical support member 74 at 78 and to the rod 80 of cylinder 82 at 84. Upon actuation of the cylinder 82, the rod 80 retracts and the lower jaw 76 swings downwardly about pivot 78 to disengage the lower jaw from the web. It will be recalled that it is necessary for the clamps to move back in the direction of the mold press a distance equal to one article length in order to be in position for the start of the next pulling movement toward the cutter. It is thus necessary to be able to swing the movable bottom clamps jaws out of contact with the web to a point where they do not contact any portion of the articles during movement of the reciprocal frame back toward the mold press. This is important because even though the clamp jaws grip the web along a flange portion, the bodies of the articles extend well below that level and would otherwise be in the path of the clamps as they move with the reciprocal frame on its return trip back in the direction of the mold press.

Still referring to FIG. 8, the bottom clamp jaw 76 can be seen to comprise clamp pad 86 and plate 88 secured together by screws 90. This arrangement permits shims to be used between the clamp pad 86 and the plate 88, if necessary, to adjust the spacing between the pad 86 and the fixed upper clamp jaw 72 according to the thickness of the flange 12 of the molded product 10. In addition, this arrangement permits the use of pointed screws 90 which extend slightly beyond the upper surface of the clamp pad 86, penetrating a portion of the flange 12 of the molded product 10 to assure a positive grip on the flange so that the web of molded products will move with the clamp when it moves toward the cutting station.

As shown in FIG. 8 the clamp 26 is gripping the flange 12 of a molded product 10. If the flange is wide enough, the two clamps 26 could grip the outer marginal longitudinal flanges of a web of connected articles at any point along their length. Usually, however, the flanges are not wide enough to accommodate the clamp surfaces and in order to grip and feed the web in this manner the flanges would have to be made extra wide, necessitating subsequent trimming. It is therefore preferred to grip the web at the transverse flanges 12a, between pairs of longitudinally connected articles 10, since this flange will readily receive the clamps and avoid the necessity of widening the outer longitudinal flanges simply for clamping and feeding purposes.

Referring to FIGS. 5 and 9, the reciprocal frame 62 is slidably moved over the longitudinal beams 65 by a cable cylinder 92 mounted on cross beams of the main frame 36 supported by vertical frame members 93. The cable 94, which is connected to the cylinder piston inside the cylinder housing, is trained over pulley wheels 95 mounted at opposite ends of the cylinder and is attached to the reciprocal frame 62 at a point midway across the width of the frame. Stops 96, located at predtermined points at the upstream ends of the longitudinal beams 65, cause the cylinder to stall out upon contact, thus stopping the reciprocal frame in the correct position to start the next feeding run toward the cutter. Alternatively, a common pneumatic or hydraulic cylinder can be used instead and the stroke set to stop the reciprocal frame at the desired location. A cable cylinder is prefered, however, due to the length of the required feed stroke.

The stop clamp 32, shown in FIGS. 4, 5 and 9, consists simply of clamping pad 98 actuated downwardly into contact with the flange 12b of the web 14 by cylinders 100. A bottom support 102 extends horizontally from the main frame 36 to form the lower fixed clamping surface against which the flange 12b is held. If the web is comprised of a single row of connected articles, thereby eliminating the flange 12b, the clamp 32 could be arranged as two separate clamps located to contact the opposite longitudinal flanges of the single row of articles, or it could be arranged across the length of the apparatus to contact the flange 12a of the web. In any event the clamp 32 would be used to assist the clamp 26 in holding the web in place during the cutting operation.

Referring to FIGS. 9, 10 and 11, the cutter is shown to consist of a serrated blade 104 mounted to coact with anvil blade 106 which is secured to support member 108 on the main frame 36. The blade 104 is mounted on a plate 110 which is moved vertically by cylinders 112 mounted on the main fame beneath the plate 88. Although it is preferred to have the movable blade located beneath the web because of spaced requirements, the layout of the apparatus could be designed to reverse the positions of the blade and anvil if necessary. While it has been found that a serrated blade will chop through the molded fiberglass more cleanly and efficiently than a continuous blade, obviosuly different types of blades could be used depending on the material of the web. As shown in FIG. 9, the vertical movement of the cutter blade 104 is preferably maintained in stable condition by meshing gears in the fixed tracks 114 and freely rotating spur gears 116.

As shown in FIG. 9, the slitter 30 includes a slitter roll 118 and an anvil roll 120. The anvil roll is mounted for free rotation while the slitter roll is powered by suitable means such as electric motor 122 mounted at the end of trunnion arms 124. This trunnion arrangement allows for easy maintenance and permits the mounting of multiple sets of slitter and anvil rolls in the event more than two longitudinal rows of connected articles are presented to the apparatus. Trunnion arms 124 are pivotally mounted at 126 to upright support member 128, and cylinder 130, mounted on the underside of horizontal support arm 132, is connected to the trunnion arms. Actuation of the cylinder 130 causes the slitter 118 to be pivoted into and out of engagement with anvil roll 120.

Referring back to FIGS. 4, 5 and 9, to summarize the operation of the apparatus, at the start of a new cycle of operation the stop clamp 32 would be open and the reciprocal frame 62 would be in starting position, that is, at its farthest upstream position. The clamps 26 on the reciprocal frame 62 at this time would be closed. At the end of the cure cycle of the mold, the mold press 20 opens and signals the web feed cycle to start. The cable cylinder 92 is actuated, causing the reciprocal frame 62 to move toward the cutter. Because the clamps 26 are in closed position, the web of connected molded products moves with the reciprocal frame. When the cable cylinder 92 reaches the end of its stroke the reciprocal frame 62 is at its farthest downstream position, having advanced the web toward the cutter a distance which has placed the next transverse connecting flange 12a directly in line with the chopper blade 104.

The completion of the stroke of the cable cylinder 92 signals the mold press to close again which in turn signals the closing of the rear stop clamp 32 and the opening of the clamps 26. The cable cylinder 92 then retracts to move the reciprocal frame 62 to its starting position and signals the closing of the clamps 26 and the actuation of the chopping blade cylinders 112. Upon retraction of the chopping blade the stop clamp 32 is signaled to open, bringing the components of the apparatus to the condition they were in at the beginning of the cycle.

The signals referred to above which actuate the next step in the operating sequence of the apparatus can be of any type well known in the art, such as signals generated by limit switches or signals controlled by computer programs.

I can now be appreciated that the apparatus of the present invention solves the problem of automatically feeding and severing webs of connected articles in a novel and highly effective manner, and in addition can be adjusted to accommodate articles of different dimensions. For example, the clamps 26 are adjustable toward and away from each other along support beam 60 to handle webs of different widths, support surfaces 22 are vertically adjustable to handle articles of different heights, and the distance the reciprocal frame 62 travels can be set to correspond to the length of the articles being produced. Further, depending on the length of the articles, the main frame 36 itself can be repositioned along track 42 if necessary in order to properly position the apparatus with respect to the point of delivery of the articles from the mold press.

Although the invention has been described particularly with respect to the feeding and cutting of molded fibrous articles, it should be understood that certain features of the method and apparatus could apply to the feeding and cutting of other types of products as well.

It should further be obvious that although a preferred embodiment of the invention has been described, it is possible to make changes to certain specific details without departing from the spirit and scope of the invention.

What is claimed is:

1. A method for intermittently feeding a web of connected molded fibrous articles directly from a mold press and severing the articles from each other, the severed articles having a plurality of flanges thereon and the depth of the articles being greater than the thickness of the web portions corresponding to the flanges of the severed articles, comprising the steps of:
   gripping the web at a location corresponding to a flange of an article, said gripping being made at a point which is adjustable depending upon the thickness of the web,
   moving the gripping means toward a cutting means after the mold press opens to thereby pull the web toward the cutting means,
   halting the movement of the gripping means when a portion of the web connecting a leading article to an adjacent trailing article is aligned with the cutting means, an uncured article previously located immediately upstream from the mold press being pulled into the mold press by the movement of the gripping means;
   closing the mold press to begin the curing cycle of the previously uncured article,
   cutting the web along the aligned connecting portion thereof to sever the leading article from the adjacent trailing article;
   pivotally opening said gripping means to release said web; and
   moving said gripping means toward said mold press.

2. A method according to claim 1 wherein the molded fibrous articles are comprised of molded fiberglass.

3. An apparatus for intermittently feeding a web of connected articles and severing the articles from each other, the severed articles having a plurality of flanges thereon and the depth of the articles being greater than the thickness of the web portions corresponding to the flanges of the severed articles, comprising:

clamps for gripping the top and bottom surfaces of said web at a point, said clamps being pivotally openable and closeable and being adjustable to the thickness of the web at said point;

means for moving the gripping means toward a cutting means to thereby pull the web in that direction;

means for halting the movement of the gripping means when a portion of the web connecting a leading article to an adjacent trailing article is aligned with the cutting means, and means for activating the cutting means after the connecting portion of the web has been aligned therewith to sever the leading article from the adjacent trailing article.

4. The apparatus according to claim 3, wherein the gripping means grips the web adjacent the longitudinal edges thereof.

5. An apparatus according to claim 3, wherein the gripping means grips the web between adjacent connected articles.

6. An apparatus according to claim 3, wherein the means for moving the clamps comprises a frame to which the clamps are secured, the frame being mounted for reciprocal movement in the direction of the length of the web of connected articles.

7. An apparatus according to claim 3, wherein the articles are comprised of molded fiberglass and the cutting means comprises a chopper blade and anvil mounted on opposite sides of the web downstream from the point of farthest downstream movement of the clamps.

8. An apparatus according to claim 3, including additionally clamping means for holding the web in place upstream of the gripping means during the cutting operation.

9. An apparatus according to claim 7, wherein the reciprocally movable frame and the chopper blade and anvil are mounted on a main frame, the main frame being adapted to be adjustably moved in the same direction of movement as the reciprocally movable frame, the apparatus further comprising means for controlling the extent of movement of the reciprocally movable frame, whereby by controlling such extent of movement and locating the main frame with respect to the source of the web, the apparatus can handle webs formed of articles of different lengths.

10. An apparatus according to claim 9, including additionally clamping means for holding the web in place upstream of the gripping means during the cutting operation, the clamping means contacting the web on the portion thereof connecting adjacent longitudinal rows of connected articles.

11. An apparatus according to claim 9, wherein the clamps are adjustably secured to the reciprocally movable frame to permit adjustment of the clamps transversely of the length of the web in order to accommodate webs of varying widths, and wherein the support surface is adjustably mounted on the main fame to permit vertical adjustment in order to accommodate webs of articles of varying heights.

* * * * *